UNITED STATES PATENT OFFICE.

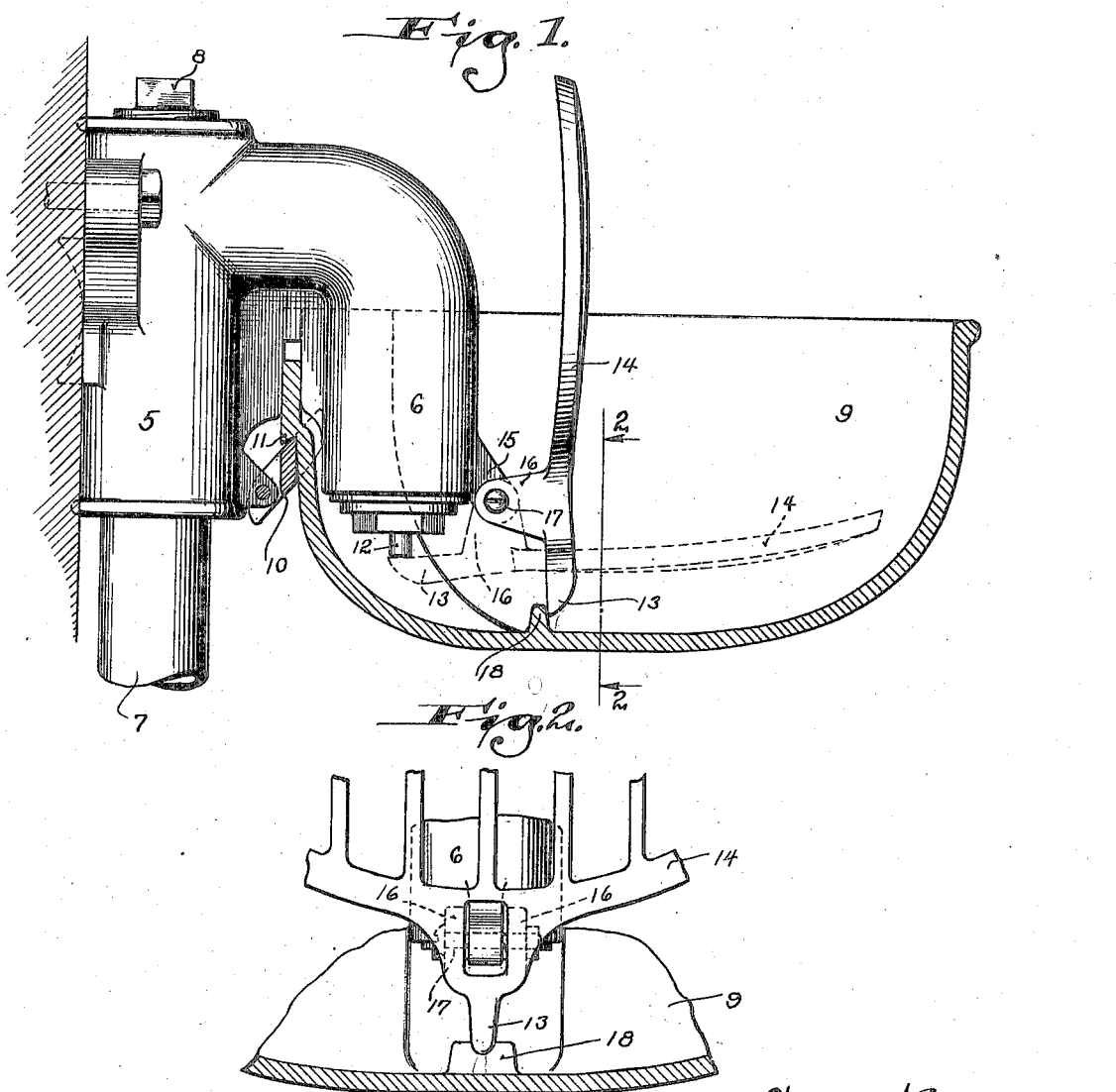

FRANK H. BOGDA, OF HORICON, WISCONSIN.

STOCK-WATERING DEVICE.

1,416,936.  Specification of Letters Patent.  Patented May 23, 1922.

Application filed September 30, 1920. Serial No. 413,696.

*To all whom it may concern:*

Be it known that I, FRANK H. BOGDA, a citizen of the United States, and resident of Horicon, in the county of Dodge and State of Wisconsin, have invented new and useful Improvements in Stock-Watering Devices, of which the following is a description, reference being had to the accompanying drawings, which are a part of this specification.

This invention relates to certain new and useful improvements in stock watering bowls.

As, at times, various animals of a herd become sick and while in such condition it it advisable to prevent them from obtaining water, it is one of the objects of this invention to provide means whereby the water bowl stationed in the stall of a sick animal may be temporarily rendered inoperative.

Another object of this invention is to provide means for rendering the valve operating mechanism of a stock watering bowl inoperative to shut off the supply of water thereto, whereby the necessity of an expensive valve structure placed in the supply pipe is eliminated.

A further object of this invention is to provide means carried by the water bowl proper and engageable with the valve engaging portion of an operating treadle to retain the same against movement.

A still further object of this invention is to provide a device of the class described capable of production without increasing the cost of the bowl.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a side view of a stock watering device embodying my invention, the bowl proper and the bowl retaining latch being shown in vertical cross-section; and Figure 2 is a fragmentary view, part in section and part in elevation, said view being taken on the plane of line 2—2 of Figure 1.

Referring now more particularly to the accompanying drawing, in which like numerals designate like parts throughout the several views:

The numerals 5 and 6 designate the vertically extending portions of a supply pipe of substantially inverted U-shape, the portion 5 being engaged at either end with a supply pipe 7. In the drawing, the lower end of portion 5 is illustrated as connected to the supply pipe and the upper end as shut off by a plug 8, but it will be understood that the water may be let in from either end.

The numeral 9 designates a bowl which is detachably connected to the supply pipe by a pivoted catch or latch 10 mounted on the pipe and engaging a projection or shoulder 11 on the bowl. The end of the portion 6 is arranged to discharge into the bowl 9 and is normally closed by any desired form of valve construction, not shown, having an operating stem 12 for engagement with a rearwardly extending lug or ear 13 of a treadle member 14.

The treadle member 14 is pivotally supported from the portion 6 by an ear 15 formed thereon and connected between two spaced ears 16, carried by the treadle member, by a pivot pin or bolt 17. The treadle 14 normally lies in its dotted line position of Figure 1 and is depressed by the animal to move the stem 12 into the supply pipe to open the valve and permit the water to flow into the bowl.

When it is desired to render the bowl inoperative by the animal, the bowl is wholly or partly removed from the supply pipe by releasing the latch 10 and the treadle then swung on its pivot to its full line position, Figure 1, when the bowl is again secured to the supply pipe by engaging the latch behind the shoulder 11. With the treadle in a substantially vertical position when the bowl is secured to the supply pipe, the extension 13 will be engaged in front of an upstanding ear or lug 18 formed on the bottom of the bowl, which will prevent the return of the treadle to its operative position, shown by dotted lines in Figure 1.

Thus it will be seen that the valve mechanism will be rendered inoperative by the animal without the necessity of placing an additional valve in the supply pipe 7 and that the only change in the present construction that is necessary is the provision of the ear or lug 18.

While, in the accompanying drawing, the projection 13 for engaging the valve 12 also engages the lug 18, it will be understood that, in the event that the specific valve structure does not necessitate the provision of such an extension 13, the treadle member may be equipped with a part for retaining the same against operation.

From the foregoing description taken in connection with the accompanying drawing, it will be obvious that I provide an extremely simple but efficient means for rendering the water supply of a bowl inoperative and at the same time permitting the same to be readily coupled for operation.

What I claim as my invention is:

1. In a device of the class described, the combination of a supply pipe provided with a discharge nozzle, a valve adapted to control said nozzle provided with a valve stem, a valve actuating member comprising a treadle pivotally secured to said nozzle and provided with an extension adapted to engage said valve stem to open said valve, and a bowl detachably secured to said nozzle and provided with a projection adapted to engage said extension to render said treadle inoperative.

2. A device of the class described, comprising a bowl, a supply pipe arranged to discharge therein, valve means controlling the supply of water into the bowl from said supply pipe and including a treadle member normally lying in a substantially horizontal plane within the bowl, and means engageable with the treadle member to secure the same in a substantially upright position whereby said valve controlling means will be rendered inoperative.

3. In a device of the class described, the combination of a supply pipe provided with a discharge nozzle, a valve adapted to control said nozzle provided with a valve stem, a valve controlling member comprising a treadle pivotally secured to said nozzle and provided with an extension adapted to engage said valve stem to open said valve, a bowl adapted to receive liquid from said nozzle and provided with a lug adapted to engage said extension to render said valve actuating member inoperative, and means for removably securing said bowl to said nozzle whereby said bowl may be moved in a substantially vertical direction to engage and disengage said lug from said extension.

In testimony whereof I affix my signature.

FRANK H. BOGDA.